US012135556B2

(12) United States Patent
Choi et al.

(10) Patent No.: US 12,135,556 B2
(45) Date of Patent: Nov. 5, 2024

(54) PROXIMITY DETECTION FOR AUTOMOTIVE VEHICLES AND OTHER SYSTEMS BASED ON PROBABILISTIC COMPUTING TECHNIQUES

(71) Applicant: Canoo Technologies Inc., Torrance, CA (US)

(72) Inventors: Jongmoo Choi, Gardena, CA (US); Kilsoo Kim, Hermosa Beach, CA (US); Siddharth Agarwal, Torrance, CA (US); Emilio Aron Moyers Barrera, Bloomfield Hills, MI (US); David R. Arft, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 307 days.

(21) Appl. No.: 17/366,866

(22) Filed: Jul. 2, 2021

(65) Prior Publication Data

US 2023/0012905 A1    Jan. 19, 2023

(51) Int. Cl.
*G05D 1/00* (2024.01)
*G06F 17/16* (2006.01)
*G06N 7/01* (2023.01)

(52) U.S. Cl.
CPC ......... *G05D 1/0219* (2013.01); *G05D 1/0223* (2013.01); *G06F 17/16* (2013.01); *G06N 7/01* (2023.01)

(58) Field of Classification Search
CPC .. G05D 1/0219; G05D 1/0223; G05D 1/0246; G05D 1/024; G05D 2201/0213; G06F 17/16; G06F 17/17; G06F 17/18; G06N 7/01
See application file for complete search history.

(56) References Cited

U.S. PATENT DOCUMENTS

| | | | |
|---|---|---|---|
| 2019/0193275 A1* | 6/2019 | Tan | B25J 11/00 |
| 2020/0043186 A1* | 2/2020 | Selviah | G06T 7/33 |
| 2020/0049511 A1* | 2/2020 | Sithiravel | G01C 21/28 |
| 2020/0065665 A1* | 2/2020 | Nageshrao | G06N 3/08 |
| 2020/0226430 A1* | 7/2020 | Ahuja | G06V 10/774 |
| 2021/0129340 A1* | 5/2021 | Babikian | B25J 15/00 |

(Continued)

OTHER PUBLICATIONS

Probabilistic navigation in dynamic environment using Rapidly-exploring Random Trees and Gaussian processes, Fulgenzi, 2008 (Year: 2008).*

(Continued)

*Primary Examiner* — Rachid Bendidi
*Assistant Examiner* — Moises Gasca Alva

(57) ABSTRACT

A method includes identifying, using at least one processor, a first point associated with an uncertain location of an object in a space and a polynomial curve associated with an uncertain location of a feature in the space. The method also includes determining, using the at least one processor, a probabilistic proximity of the object and the feature. The probabilistic proximity is determined by identifying a second point on the polynomial curve, transforming an uncertainty associated with the polynomial curve into an uncertainty associated with the second point, and identifying the probabilistic proximity of the object and the feature using the first and second points and the uncertainty associated with the second point.

15 Claims, 7 Drawing Sheets

(56) References Cited

U.S. PATENT DOCUMENTS

2021/0269059 A1* 9/2021 Djuric .................... G06N 3/088
2021/0403008 A1* 12/2021 Grossman ............... G06T 7/246
2022/0161791 A1* 5/2022 Seegmiller ........ B60W 30/0956

OTHER PUBLICATIONS

Curvilinear-Coordinate-Based Object and Situation Assessment for Highly Automated Vehicles, Kim, 2015 (Year: 2015).*
International Search Report and Written Opinion dated Oct. 19, 2022 in connection with International Patent Application No. PCT/US22/32523, 7 pages.
Ahangar, "Introduction to Statistical Geometry," Proceedings of the 2010 International Conference on Scientific Computing, Jul. 2010, 6 pages.
Ahangar, "Harmonic Probability Density Function, Modeling, and Regression," European International Journal of Science and Technology, vol. 2, No. 5, Jun. 2013, 9 pages.
Maesschalck et al., "The Mahalanobis distance Tutorial," Chemometrics and Intilligent Laboratory System, vol. 50, 2000, 18 pages.
Mahalanobis, "On the Generalized Distance in Statistics," vol. II, No. 1, Apr. 1936, 7 pages.
Schweppe, "On the Bhattacharyya Distance and the Divergence between Gaussian Processes," Information and Control, vol. 11, 1967, 23 pages.

* cited by examiner

PROXIMITY DETECTION FOR AUTOMOTIVE VEHICLES AND OTHER SYSTEMS BASED ON PROBABILISTIC COMPUTING TECHNIQUES

TECHNICAL FIELD

This disclosure relates generally to proximity detection. More specifically, this disclosure relates to proximity detection for automotive vehicles and other systems based on probabilistic computing techniques.

BACKGROUND

Identifying proximity is often an important or useful function in many autonomous applications, such as self-driving vehicles and service robots, and other applications. A measurement of an object from a sensor or a predicted or generated measurement associated with an object can be represented as a geometric entity, such as a two-dimensional (2D) or three-dimensional (3D) point, a 2D line segment, or a 3D point cloud. When multiple geometric entities are available, it is often necessary or desirable to measure the proximity between the entities, meaning the distance between the entities.

SUMMARY

This disclosure provides proximity detection for automotive vehicles and other systems based on probabilistic computing techniques.

In a first embodiment, a method includes identifying, using at least one processor, a first point associated with an uncertain location of an object in a space and a polynomial curve associated with an uncertain location of a feature in the space. The method also includes determining, using the at least one processor, a probabilistic proximity of the object and the feature. The probabilistic proximity is determined by identifying a second point on the polynomial curve, transforming an uncertainty associated with the polynomial curve into an uncertainty associated with the second point, and identifying the probabilistic proximity of the object and the feature using the first and second points and the uncertainty associated with the second point.

In a second embodiment, an apparatus includes at least one processor configured to identify a first point associated with an uncertain location of an object in a space and a polynomial curve associated with an uncertain location of a feature in the space and determine a probabilistic proximity of the object and the feature. To determine the probabilistic proximity, the at least one processor is configured to identify a second point on the polynomial curve, transform an uncertainty associated with the polynomial curve into an uncertainty associated with the second point, and identify the probabilistic proximity of the object and the feature using the first and second points and the uncertainty associated with the second point.

In a third embodiment, a non-transitory machine-readable medium contains instructions that when executed cause at least one processor to identify a first point associated with an uncertain location of an object in a space and a polynomial curve associated with an uncertain location of a feature in the space and determine a probabilistic proximity of the object and the feature. The instructions that when executed cause the at least one processor to determine the probabilistic proximity include instructions that when executed cause the at least one processor to identify a second point on the polynomial curve, transform an uncertainty associated with the polynomial curve into an uncertainty associated with the second point, and identify the probabilistic proximity of the object and the feature using the first and second points and the uncertainty associated with the second point.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
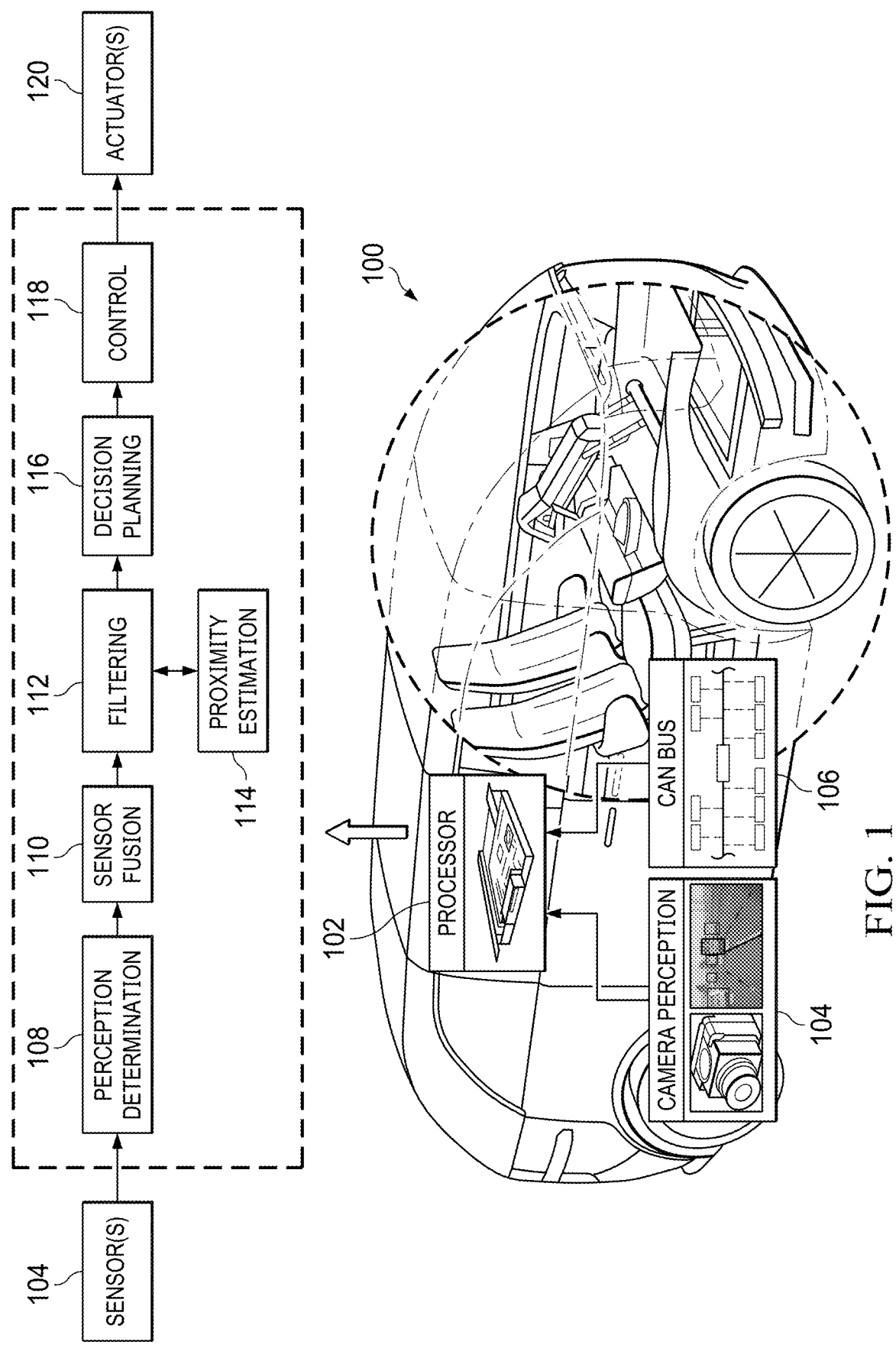
FIG. 1 illustrates an example system supporting proximity detection based on probabilistic computing according to this disclosure.

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, identifying proximity is often an important or useful function in many autonomous applications, such as self-driving vehicles and service robots, and other applications. A measurement of an object from a sensor or a predicted or generated measurement associated with an object can be represented as a geometric entity, such as a two-dimensional (2D) or three-dimensional (3D) point, a 2D line segment, or a 3D point cloud. When multiple geometric entities are available, it is often necessary or desirable to measure the proximity between the entities, meaning the distance between the entities.

If two entities are associated with two certain points in space, it is possible to measure proximity between the entities using the geometric distance (also known as the Euclidean distance) between the two points. If two entities are associated with one certain point and one uncertain point in space, it is possible to measure proximity between the entities using a Mahalanobis distance, which is a statistical distance between the certain point and a Gaussian distribution associated with the uncertain point. If two entities are associated with two uncertain points in space, it is possible to measure proximity between the entities using a Bhattacharyya distance, which is a statistical distance between two Gaussian distributions associated with the two uncertain points.

While these types of distances are well-defined, there are situations in various applications that involve proximity detection between geometric entities of different types. For example, proximity detection may be needed to determine the statistical distance between an uncertain point and an uncertain line or curve. As a particular example, a self-driving vehicle may need to determine the proximity between an external object's detected location (represented as an uncertain point in space) and a predicted path of the vehicle, an estimated center location of a lane in which the vehicle is traveling, or an estimated location of a lane-marking line or other marking on a road or other surface on which the vehicle is traveling (represented as an uncertain line or curve in space). As another particular example, a "follow the line" autonomous robot may need to determine the proximity between an external object's detected location (represented as an uncertain point in space) and a line being followed in a factory, industrial, or other setting (represented as an uncertain line or curve in space). In some cases, this is simplified by determining the statistical distance between the uncertain point and the closest point of the uncertain line or curve while ignoring noise statistics of the point and the line or curve. However, this approach may not provide accurate results since the noise statistics are not considered.

This disclosure provides techniques for proximity detection based on probabilistic computing, which can be used in autonomous applications (such as self-driving vehicles and autonomous robots) or other applications. As described in more detail below, a probabilistic proximity between an uncertain point and an uncertain polynomial (representing an uncertain line or curve) can be determined. In some embodiments, the uncertain point may represent or be based on one or more measurements captured by a radio detection and ranging (RADAR) sensor, a light detection and ranging (LIDAR) sensor, or other sensor(s). As a particular example, one or more sensors can be used to identify one or more estimated positions of one or more external objects around a vehicle, robot, or other system. In other embodiments, the uncertain point may represent an uncertain point calculated for an object, such as an estimated location of an object at some future point in time, which can be based on sensor measurements from one or more sensors. Also, in some embodiments, the uncertain polynomial may represent or be based on one or more measurements by a camera, other imaging sensor, or other sensor(s). As a particular example, one or more sensors can be used to identify estimated positions of lane-marking lines or other lines around a vehicle, robot, or other system. In other embodiments, the uncertain polynomial may represent an uncertain line or curve calculated using sensor measurements, such as when an inertial measurement unit (IMU) or other sensor(s) can be used to estimate a future path of a vehicle, robot, or other system or to estimate a center of a current lane for the vehicle. In general, the described approaches may be used with any suitable geometric entities that represent any suitable real-world characteristics. The determined probabilistic proximity between two geometric entities can be used in various ways, such as to control the operation of an autonomous system or other system. As particular examples, probabilistic proximities may be used to control the steering, speed, acceleration, or braking of a self-driving vehicle or to control the movements of an autonomous robot. Probabilistic proximities may also be used to control audible, visible, haptic, or other warnings for a driver of a vehicle or other person.

In this document, the term "uncertain" (when used to describe a point, line, curve, polynomial, or other geometric entity) indicates that there is some uncertainty or ambiguity regarding the exact location of the geometric entity in space. This ambiguity may be caused by any number of factors. For example, the normal operations of RADAR, LIDAR, camera, IMU, or other sensors may inherently have some ambiguities or uncertainties in the generated measurements. As another example, a collection of multiple measurements from one or more sensors may be used to estimate the location of a geometric entity in space, and the multiple measurements may have slight differences that give rise to uncertainty in the estimated location.

FIG. 1 illustrates an example system 100 supporting proximity detection based on probabilistic computing according to this disclosure. In this particular example, the system 100 takes the form of an automotive vehicle, such as an electric vehicle. However, any other suitable system may support proximity detection based on probabilistic computing, such as other types of vehicles, autonomous robots, or other autonomous or non-autonomous systems.

As shown in FIG. 1, the system 100 includes at least one processor 102 configured to control one or more operations of the system 100. In this example, the processor 102 may interact with one or more sensors 104 and with one or more components coupled to a bus 106. In this particular example, the one or more sensors 104 include one or more cameras or other imaging sensors, and the bus 106 represents a controller area network (CAN) bus. However, the processor 102 may interact with any other or additional sensor(s) and communicate over any other or additional bus(es).

The sensors 104 here may generate measurements that are represented as geometric entities and/or generate measurements that are used by the processor 102 or other component (s) to produce geometric entities. For example, the sensors 104 may identify locations of objects around or proximate to the system 100, such as one or more vehicles or other objects in front of the system 100. The sensors 104 may also be used to perceive lane-marking lines or other markings on a road, floor, or other surface. The sensors 104 may further be used to generate measurements that are themselves used to predict the future path(s) of the system 100 or other vehicles, identify a center of a lane in which the system 100 is traveling, or predict the future locations of objects around the system 100. The processor 102 here supports functionality to estimate the proximities of various geometric entities and optionally take action based on the estimated proximities. Any suitable type(s) of sensor(s) 104 may be used in the system 100, such as one or more RADAR sensors, LIDAR sensors, cameras or other imaging sensors, IMUs, etc.

In this example, the processor 102 performs a perception determination function 108, which generally involves estimating the environment around the system 100 in a real-time manner. For example, the perception determination function 108 can use inputs from one or more sensors 104 to determine whether there are external objects around the system 100, such as other vehicles moving around or towards the system 100 or pedestrians in front of the system 100. The perception determination function 108 can also use inputs from one or more sensors 104 to determine whether there are lane-marking lines or other markings in front of the system 100 on a road or other surface on which the system 100 is traveling. The perception determination function 108 can further determine an estimated future path of the system 100, an estimated center of a lane in which the system 100 is traveling, or estimated locations of the various objects in space around the system 100 in the near future. The perception determination function 108 may determine any other or additional characteristics of the environment around the system 100.

The processor 102 also performs a sensor fusion function 110, which can combine measurements from different sensors 104 and/or estimated locations from the perception determination function 108 that are based on measurements from different sensors 104. For example, the sensor fusion function 110 may combine estimated locations of the same object or characteristic from multiple sensors 104 or from the perception determination function 108 in order to obtain an improved location estimate for the object or characteristic. The sensor fusion function 110 may combine measurements from different sensors 104 and/or estimated locations from the perception determination function 108 in any other suitable manner as needed or desired.

The processor 102 further performs a filtering function 112, which can filter various outputs of the perception determination function 108 and/or the sensor fusion function 110. For example, the filtering function 112 may use the various outputs of the perception determination function 108 and/or the sensor fusion function 110 to track locations of the system 100 and other objects around the system 100, as well as to classify objects as objects of interest or not (such as by identifying a closest in-path vehicle or "CIPV," which is useful in functions like autonomous driving). As particular examples, the filtering function 112 may implement a Bayes or Kalman filter as an additional state estimation or a spatial filter to identify objects of interest, although any other suitable filtering function may be used here.

As shown in this example, the filtering function 112 can interact with a proximity estimation function 114, which performs proximity detection based on probabilistic computing. For example, as described in more detail below, the proximity estimation function 114 can be used to estimate a probabilistic distance (proximity) between an uncertain point (such as a point representing an external object) and an uncertain polynomial (such as a polynomial representing an estimated vehicle path, an estimated center of a lane, an estimated location of a lane-marking line, or other line or curve). The proximity estimation function 114 can use the techniques described below to perform this function.

Locations of geometric entities and proximities between the geometric entities may be provided to a decision planning function 116, which can use this information (and possibly other information) to determine how to adjust the operation of the system 100. For example, in an automotive vehicle, the decision planning function 116 may determine whether (and how) to change the steering direction of the vehicle, whether (and how) to apply the brakes or accelerate the vehicle, or whether (and how) to trigger an audible, visible, haptic, or other warning. In an autonomous robot, the decision planning function 116 may determine whether (and how) to change the direction of travel or other operations of the robot. In general, the identified adjustments determined by the decision planning function 116 can vary widely based on the specific application.

The decision planning function 116 can interact with one or more control functions 118, each of which can be used to adjust or control the operation of one or more actuators 120 in the system 100. For example, in an automotive vehicle, the one or more actuators 120 may represent one or more brakes, electric motors, or steering components of the vehicle, and the control function(s) 118 can be used to apply or discontinue application of the brakes, speed up or slow down the electric motors, or change the steering direction of the vehicle. In an autonomous robot, the one or more actuators 120 may represent one or more motors used to propel the robot or equipment carried by the robot, and the control function(s) 118 can be used to control the operation of the motor(s) or the equipment. In general, the specific way(s) in which determined proximities can be used may vary depending on the specific system 100 in which the proximities are being used.

Note that the functions 108-118 shown in FIG. 1 and described above may be implemented in any suitable manner in the system 100. For example, in some embodiments, various functions 108-118 may be implemented or supported using one or more software applications or other software instructions that are executed by at least one processor 102. In other embodiments, at least some of the functions 108-118 can be implemented or supported using dedicated hardware components. In general, the functions 108-118 described above may be performed using any suitable hardware or any suitable combination of hardware and software/firmware instructions.

The processor 102 itself may also be implemented in any suitable manner, and the system 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108-118 described above. This may allow, for instance, the processor(s) 102 to be used to identify proximities involving multiple sets of geometric entities in parallel.

Although FIG. 1 illustrates one example of a system 100 supporting proximity detection based on probabilistic computing, various changes may be made to FIG. 1. For example, various functions and components shown in FIG. 1 may be combined, further subdivided, replicated, omitted, or rearranged and additional functions and components may be added according to particular needs. Also, as noted above, the functionality for proximity detection may be used in any other suitable system, and the system may or may not relate to automotive vehicles or other vehicles.

Figure 2:
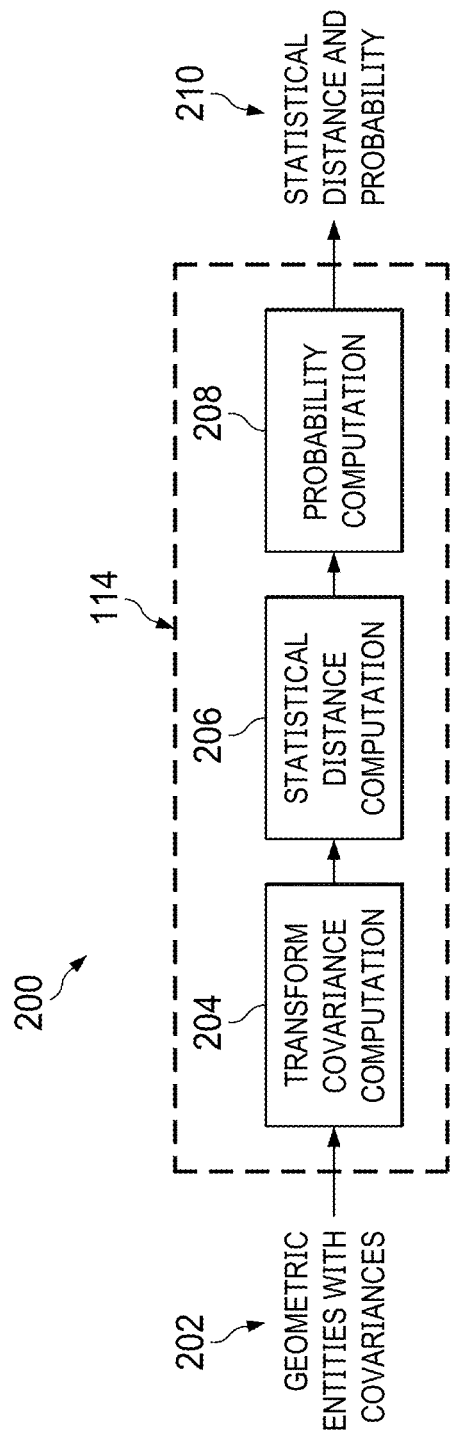
FIG. 2 illustrates an example architecture supporting proximity detection based on probabilistic computing according to this disclosure.

FIG. 2 illustrates an example architecture 200 supporting proximity detection based on probabilistic computing according to this disclosure. More specifically, the example architecture 200 shown in FIG. 2 may be used to implement the proximity estimation function 114 described above. For ease of explanation, the architecture 200 of FIG. 2 is described as being used in the system 100 of FIG. 1. However, the architecture 200 of FIG. 2 may be used in any other suitable device or system, such as any other suitable device or system supporting or using proximity detection.

As shown in FIG. 2, the architecture 200 receives various geometric entities 202, which represent the locations of various objects or other features captured using the sensors 104 or generated using measurements from the sensors 104. For example, the geometric entities 202 may represent points, lines, or curves and be associated with objects, lines on roads or floors, or other detected characteristics. As a particular example, a 2D point may represent the estimated location of a detected object, such as the 2D coordinates of another vehicle, a pedestrian, or other object near a host vehicle (the system 100) detected using a RADAR, LIDAR, or other sensor. As another particular example, a 2D curve may represent an estimated path or trajectory of the host vehicle (such as one estimated using an IMU), the center line of a lane, or a lane-marking line estimated/detected by a camera or other sensor.

Each geometric entity 202 is associated with a covariance (such as a covariance matrix) that identifies the uncertainty associated with that geometric entity 202. As an example, for a geometric entity 202 that represents a 2D point defined using (x, y) coordinates, the uncertainty associated with the 2D point can take the form of a 2×2 covariance matrix defined as:

$$\Sigma = \begin{pmatrix} c_{11} & c_{12} \\ c_{21} & c_{22} \end{pmatrix} \quad (1)$$

Here, $c_{11}$ and $c_{22}$ represent variances of the x and y coordinates, respectively. Also, $c_{12}$ and $c_{21}$ represent the covariance of the x and y coordinates and are identical. The covariance matrix can be visualized as an ellipsoid around the point identifying an estimated location of an object.

As another example, a 2D curve can be represented by an $n^{th}$-order polynomial, which can be expressed as:

$$\Sigma_{k=0}^{n} \alpha_k x^k \quad (2)$$

Figure 3:
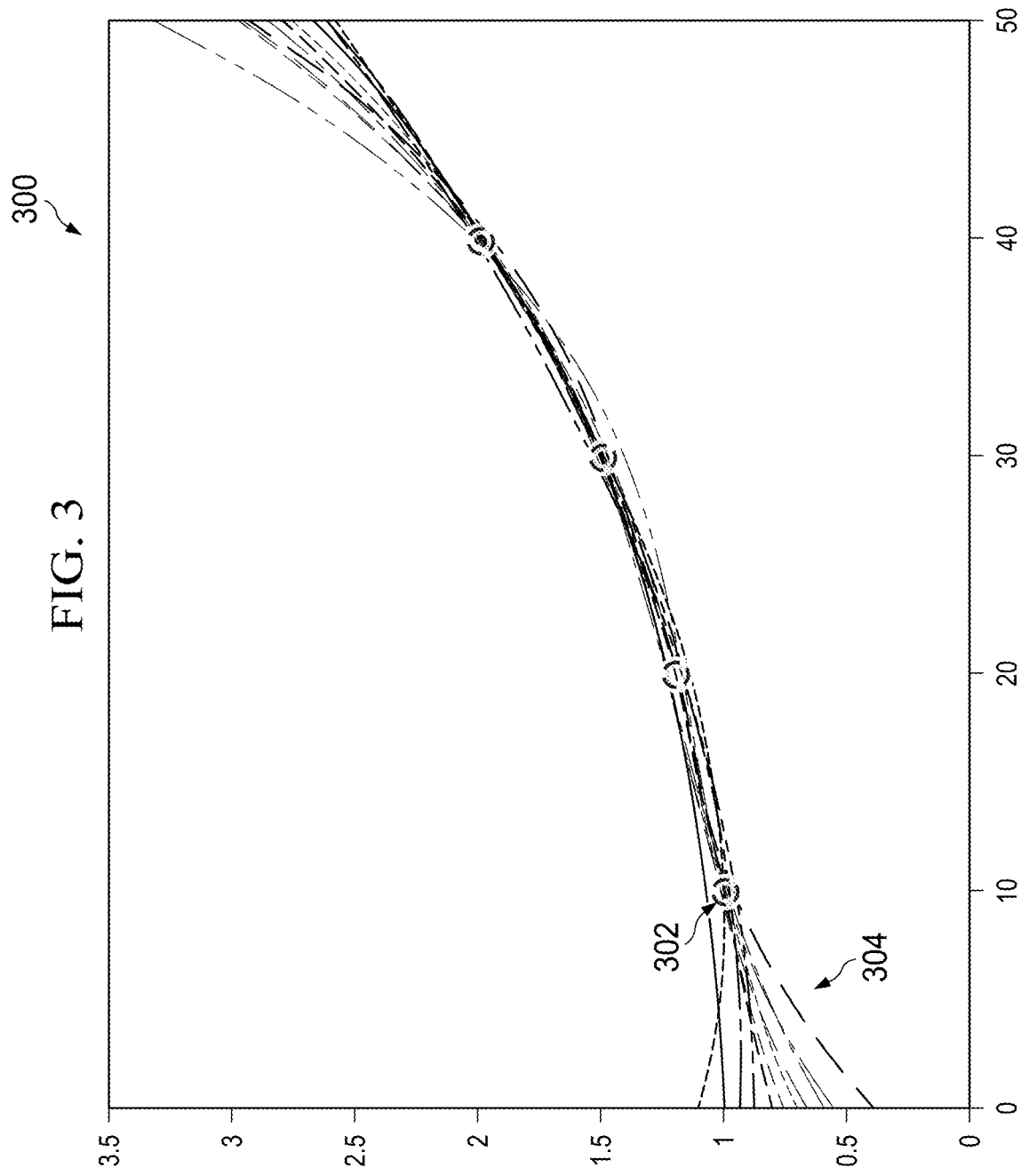
FIG. 3 illustrates a graph of example uncertainties associated with a polynomial according to this disclosure.

The uncertainty of the $n^{th}$-order polynomial can take the form of an (n+1)×(n+1) covariance matrix of the polynomial's coefficients. A straight line can be viewed as a special case of a polynomial. FIG. 3 illustrates a graph 300 of example uncertainties associated with a polynomial according to this disclosure. As shown in FIG. 3, there are four data points 302 identified, which may represent uncertain data points. There are also a number of polynomial curves 304 identified, which represent different polynomials that can be estimated to pass through or very near the uncertain data points 302. Thus, a given polynomial curve 304 that is selected to represent a vehicle path, center lane line, lane-marking line, or other characteristic can be uncertain.

Figure 4:
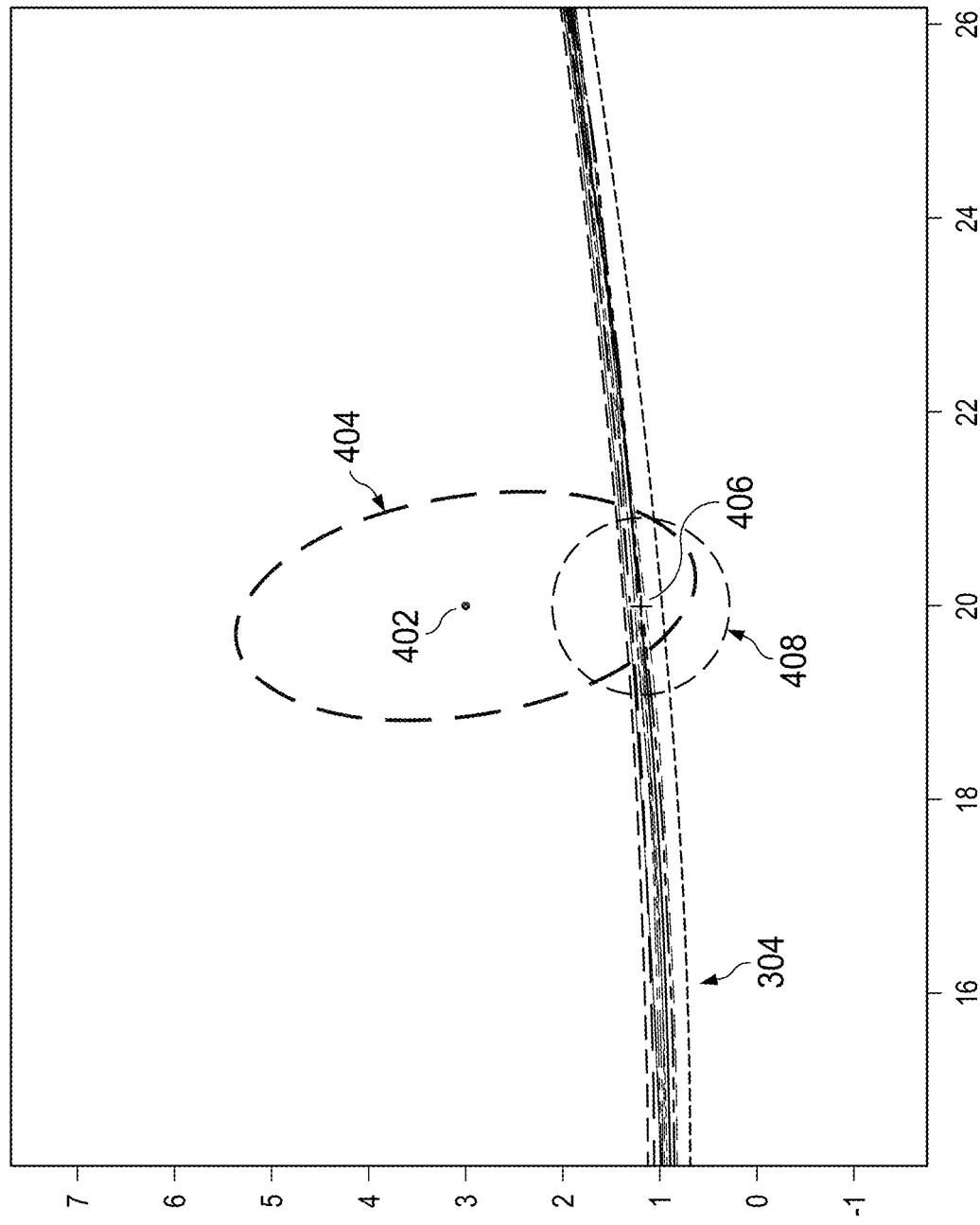
FIG. 4 illustrates a graph of an example proximity detection between an uncertain point and an uncertain polynomial according to this disclosure.

Because of this, performing proximity detection between one geometric entity representing an uncertain point and another geometric entity representing an uncertain polynomial (an uncertain line or curve) is typically difficult. FIG. 4 illustrates a graph 400 of an example proximity detection between an uncertain point and an uncertain polynomial according to this disclosure. As can be seen here, an uncertain point 402 is associated with an uncertainty defined by an ellipsoid 404, which (as noted above) can be defined by a 2×2 covariance matrix associated with the uncertain point 402. The polynomial curves 304 are also shown here, and any one of the polynomial curves 304 may be selected and used here as an uncertain polynomial.

The proximity estimation function 114 uses the architecture 200 shown in FIG. 2 to perform proximity detection and identify a probabilistic proximity between an uncertain point (such as the point 402) and an uncertain line or curve (such as any of the polynomial curves 304). As shown in FIG. 2, the proximity estimation function 114 includes a transform covariance computation 204, which operates to transform the covariance of the polynomial coefficients of a curve (such as a selected polynomial curve 304) to a corresponding 2D covariance of a point on the curve. In some embodiments, the transform covariance computation 204 transforms the (n+1)×(n+1) covariance matrix of the selected polynomial curve 304 into a 2×2 covariance matrix of a point 406 associated with the selected polynomial curve 304 as shown in FIG. 4. The 2×2 covariance matrix of the point 406 defines an ellipsoid 408 around the point 406, which represents the uncertainty associated with the point 406. This transformation may occur using eigenvalues of the covariance matrix of the selected polynomial curve 304.

In particular embodiments, the transform covariance computation 204 operates as follows. Assume that the uncertainty of a selected polynomial curve 304 can be represented by a 4×4 covariance matrix, where entries $c_{j,k}$ of this covariance matrix include diagonal entries (where j=k) representing the variance of each variable (polynomial coefficient) and other entries (where j≠k) representing the covariance between the $j^{th}$ and $k^{th}$ variables (polynomial coefficients). Given a point 402 defined as $p=(x_1, y_1)$ and a selected polynomial curve 304 defined as shown in Equation (2) above, the transform covariance computation 204 can compute the location of a point 406 defined as $q=(x_2, y_2)$ on the selected polynomial curve 304, where a line extending from p to q is a normal vector of the selected polynomial curve 304. The transform covariance computation 204 can transform the 4×4 covariance matrix of the selected polynomial curve 304 into a 2×2 covariance matrix that represents the uncertainty of the corresponding point q on the selected polynomial curve 304. To simplify this transform, it may be assumed that the uncertainty in a direction perpendicular to the line (p, q) is important and that the uncertainty in a direction parallel to the line (p, q) is the same. With this assumption, it is possible to assume that the variances $c_{11}$ and $c_{22}$ are equal and that the covariances $c_{12}$ and $c_{21}$ are zeros. Note that while this example transforms a 4×4 covariance matrix, the same type of approach may be used for covariance matrices of other sizes.

For a selected polynomial curve 304 defined as shown in Equation (2) above with $\alpha_k \sim \mathcal{N}(\mu_k, \sigma_k^2)$, the uncertainty of the point 406 on the polynomial curve 304 can be expressed by the maximum variance of the (n+1)×(n+1) covariance matrix of the polynomial coefficients. This can be expressed as:

$$c = \sqrt{\sigma_0^2} \quad (3)$$

where $\sigma_0^2$ represents the first eigenvalue of the covariance matrix. In some cases, the eigenvalues of the covariance matrix can be computed using singular value decomposition, which can be expressed as:

$$[U, S, V] = svd(C); \sigma_0^2 = S(0,0) \quad (4)$$

Using this approach, a point 406 on a selected polynomial curve 304 can be identified, and a variance associated with the point 406 can be determined based on the polynomial curve's covariance matrix of its polynomial coefficients. Note, however, that the transform covariance computation 204 may use other approaches to transform the covariance of the polynomial coefficients of a selected polynomial curve 304 into a corresponding covariance of a point 406, such as by using a linear combination of variances or computing the 2D covariance with a sampling technique.

The proximity estimation function 114 also includes a statistical distance computation function 206, which operates to calculate a statistical distance between a target point (the point 402) and the estimated closest point on the selected polynomial curve 304 (the point 406). In some embodiments, the statistical distance computation function 206 can determine the Mahalanobis distance or the Bhattacharyya distance between the points 402 and 406. The Mahalanobis distance is defined between a Gaussian distribution and a point or between two identical Gaussian distributions. To determine a statistical distance between two different Gaussian distributions, Kullback-Leibler divergence or Bhattacharyya distance may be used. One possible drawback of using Kullback-Leibler divergence is that the distance is not symmetrical, meaning the distance from point 402 to point 406 may be different than the distance from point 406 to point 402. Thus, in some cases, Bhattacharyya distance can be used. In those cases, given two 2D Gaussian distributions (multivariate normal distributions) $X_i \sim \mathcal{N}(\mu_i, \sigma_i^2)$, the Bhattacharyya distance is defined as:

$$D_B = \frac{1}{8}(\mu_1 - \mu_2)^T \sum\nolimits^{-1}(\mu_1 - \mu_2) + \frac{1}{2}\ln\left(\frac{\det \sum}{\sqrt{\det \sum_1 \det \sum_2}}\right) \quad (5)$$

where $\mu_i$ and $\Sigma_i$ are the means and covariances of the distributions and $$\sum = \frac{\sum_1 + \sum_2}{2}.$$

The proximity estimation function 114 further includes a probability computation function 208, which operates to calculate a probability that the point 402 is actually part of the selected polynomial curve 304. In some embodiments, the probability computation function 208 can determine the proximity probability based on the geometric distance and the statistical distance between the points 402 and 406. For example, the proximity probability may be calculated as:

$$P(p \in L) = 1 - \frac{D_B(p, q)}{D_E(p, q)} \quad (6)$$

where $D_B(p,q)$ and $D_E(p,q)$ respectively represent the Bhattacharyya or other statistical distance and the geometric distance.

The proximity estimation function 114 here generates outputs 210 that include the statistical distance and the proximity probability. These outputs 210 can be used by the filtering function 112, decision planning function 116, or other function(s) in the system 100 or other system. Note that since the architecture 200 considers the uncertainties of both points and curves, various functions may be implemented more effectively. For example, an advanced driver assistance system (ADAS) or other control system may be able to perform automated driving operations or other operations more reliably even in the presence of noisy sensor measurements.

Note that the computations 204-208 shown in FIG. 2 and described above may be implemented in any suitable manner. For example, in some embodiments, various computations 204-208 may be implemented or supported using one or more software applications or other software instructions that are executed by at least one processor 102 or other device(s). In other embodiments, at least some of the computations 204-208 can be implemented or supported using dedicated hardware components. In general, the computations 204-208 described above may be performed using any suitable hardware or any suitable combination of hardware and software/firmware instructions.

Although FIG. 2 illustrates one example of an architecture 200 supporting proximity detection based on probabilistic computing, various changes may be made to FIG. 2. For example, various functions shown in FIG. 2 may be combined, further subdivided, replicated, omitted, or rearranged and additional functions may be added according to particular needs. Although FIG. 3 illustrates one example graph 300 of uncertainties associated with a polynomial and FIG. 4 illustrates one example graph 400 of proximity detection between an uncertain point and an uncertain polynomial, various changes may be made to FIGS. 3 and 4. For instance, FIGS. 3 and 4 are meant to illustrate one example of uncertainties and one example of proximity detection. Other geometric entities may have any other uncertainties and be used to perform any other proximity detections.

Figure 5A:
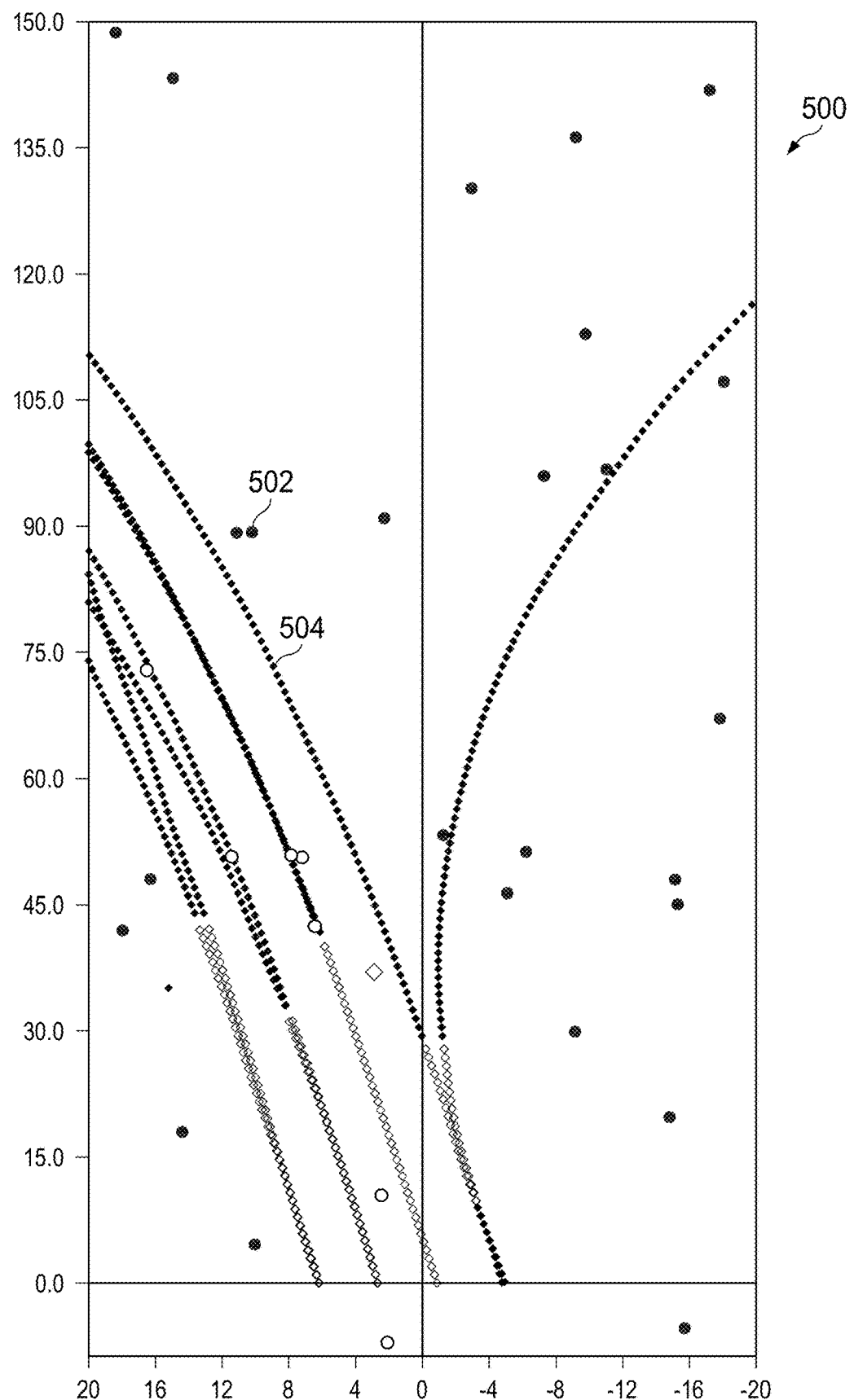
FIGS. 5A and 5B illustrate example applications of proximity detection between uncertain points and uncertain polynomials according to this disclosure.
Figure 5B:
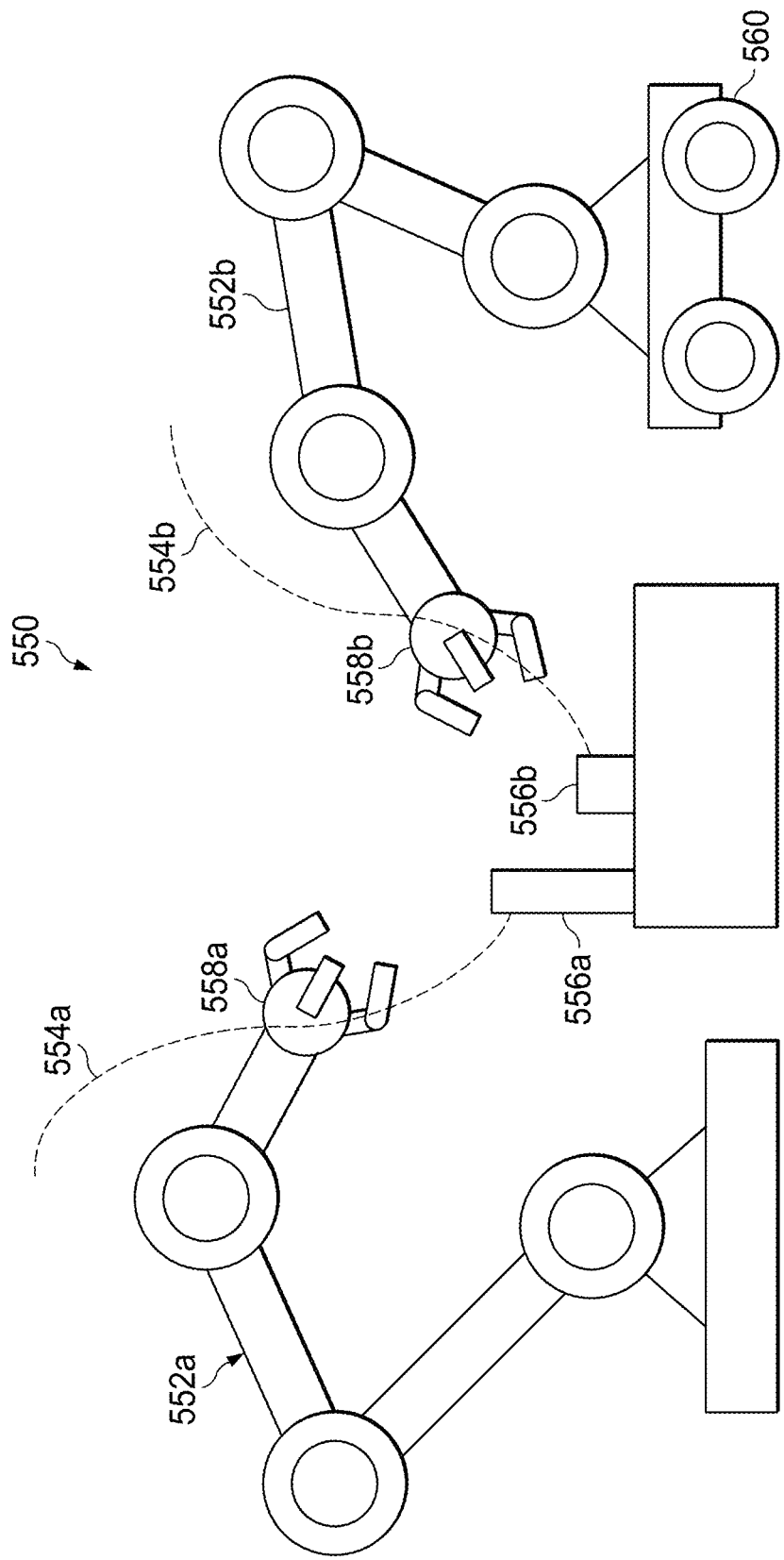

FIGS. 5A and 5B illustrate example applications 500, 550 of proximity detection between uncertain points and uncertain polynomials according to this disclosure. For ease of explanation, the applications 500, 550 of FIGS. 5A and 5B are described as being supported by the system 100 of FIG. 1 using the proximity estimation function 114 of FIG. 2. However, the system 100 and the proximity estimation function 114 may be used with any other suitable application.

As shown in FIG. 5A, a bird's eye view of a space is shown. In this example, various points 502 may represent detected or calculated locations of objects. Also, various polynomial curves 504 may represent detected or calculated locations of features such as a vehicle's estimated path, estimate center lane lines, estimated lane-marking lines, or other markings or features. The points 502 and polynomial curves 504 here may be identified based on information from various sensors 104.

At least one processor 102 may use the architecture 200 described above to identify proximities of different points 502 and different polynomial curves 504. For example, the processor 102 may use the architecture 200 to identify the proximities of various points 502 representing external objects to the polynomial curve 504 representing a current estimated path of a vehicle. The processor 102 can use these proximities in order to determine whether to perform one or more functions, such as altering the speed or path of the vehicle. As a particular example, the processor 102 may change the path of the vehicle or accelerate/decelerate the vehicle in order to avoid a possible collision with an object or to keep the vehicle within a specific lane.

As can be seen in the example of FIG. 5A, a large number of points 502 and polynomial curves 504 may be identified and processed to identify any number of proximities. As noted above, in some cases, the system 100 may include multiple processors 102 and/or one or more processors 102 may each include multiple processing cores or engines. In these embodiments, different processors 102 and/or different processing cores or engines in the processor(s) 102 may be used to perform proximity detection for different combinations of points 502 and polynomial curves 504. This is because the proximity between one point 502 and one curve 504 is independent of the proximities between other points 502 and curves 504, so the proximities may be determined in parallel if desired. This may help to facilitate use of the proximity detection techniques in crowded environments or in environments where real-time decisions are made.

As shown in FIG. 5B, each of one or more autonomous robots 552a-552b may have a robotic arm or other portion that can follow an estimated trajectory 554a-554b in order to grasp, manipulate, or otherwise interact with an object 556a-556b. Each autonomous robot 552a-552b may include one or more sensors 558a-558b, such as one or more cameras or LIDAR sensors (which may represent the sensors 104 of FIG. 1). The sensors 558a-558b can be used to sense the objects 556a-556b, such as to sense the locations of the objects 556a-556b relative to the robotic arms. In this example, the autonomous robot 552a represents a fixed robot, meaning the autonomous robot 552a remains in the same location. In contrast, the autonomous robot 552b represents a mobile robot, meaning the autonomous robot 552b includes wheels 560 or other structures that allow movement of the autonomous robot 552b. As a result, the trajectory 554b may have a higher uncertainty relative to the trajectory 554a. However, the sensed locations of the objects 556a-556b and the estimated trajectories 554a-554b may all have some amount of uncertainty.

At least one processor 102 in each autonomous robot 552a-552b may use the architecture 200 described above to identify proximities of the associated trajectory 554a-554b to the associated object 556a-556b. The processor 102 in each autonomous robot 552a-552b can use these proximities in order to determine whether to perform one or more functions, such as adjusting the associated trajectory 554a-554b so that the associated object 556a-556b can be grasped or otherwise manipulated.

Although FIGS. 5A and 5B illustrate examples of applications 500, 550 of proximity detection between uncertain points and uncertain polynomials, various changes may be made to FIGS. 5A and 5B. For example, the system 100 and the proximity estimation function 114 may detect any other suitable points and polynomial curves.

Figure 6:
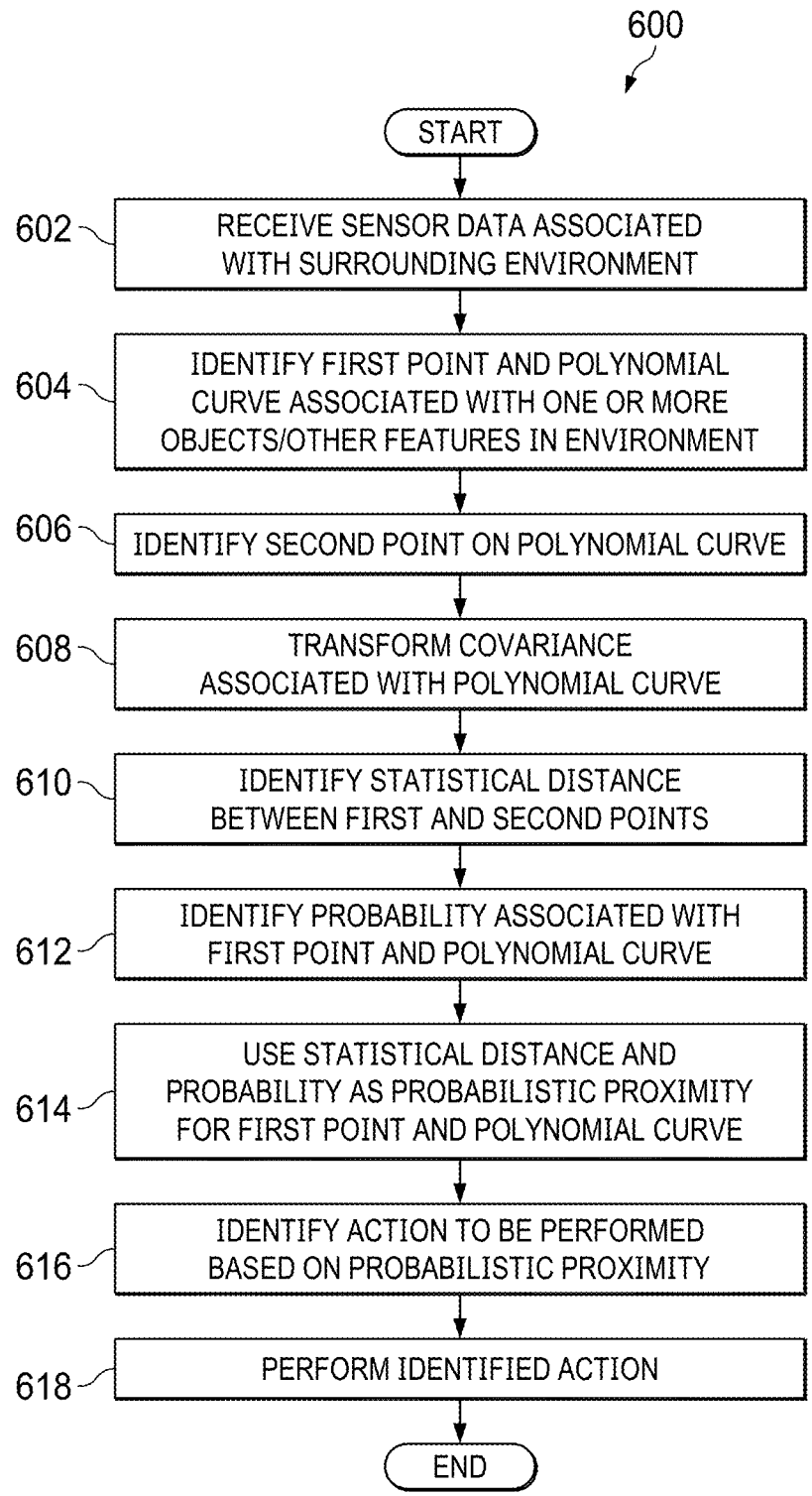
FIG. 6 illustrates an example method for proximity detection based on probabilistic computing according to this disclosure.

FIG. 6 illustrates an example method 600 for proximity detection based on probabilistic computing according to this disclosure. For ease of explanation, the method 600 of FIG. 6 is described as being performed in the system 100 of FIG. 1 using the proximity estimation function 114 of FIG. 2. However, the method 600 may involve the use of any other suitable device in any other suitable system.

As shown in FIG. 6, sensor data associated with an environment is received at step 602. This may include, for example, the processor 102 of the system 100 receiving measurements or other information from one or more sensors 104. A first point and a polynomial curve associated with one or more objects or other features in the environment are identified at step 604. This may include, for example, the processor 102 identifying one or more geometric entities in the received sensor data and/or generating one or more geometric entities based on the sensor data or other data. The geometric entities here can include a point 402 (which may identify an estimated location of a detected object) and a selected polynomial curve 304 (which may identify an estimated trajectory, center lane line, lane-marking line, or other feature).

A second point on the polynomial curve is identified at step 606, and a covariance associated with the polynomial curve is transformed at step 608. This may include, for example, the processor 102 identifying the point 406 on the selected polynomial curve 304 that is closest to the first point 402. This may also include the processor 102 transforming the covariance matrix associated with the selected polynomial curve 304 into a covariance matrix associated with the second point 406.

A statistical distance between the first and second points is identified at step 610. This may include, for example, the processor 102 identifying the Mahalanobis distance, the Bhattacharyya distance, the Kullback-Leibler divergence, or other statistical distance between the points 402 and 406. A probability associated with the first point and the polynomial curve is identified at step 612. This may include, for example, the processor 102 calculating the probability that the point 402 lies on the selected polynomial curve 304. In some cases, the probability is based on the statistical distance and the geometric distance between the points 402 and 406.

The statistical distance and the probability are used as a probabilistic proximity for the first point and the polynomial curve at step 614, meaning they represent the determined proximity of the first point and the polynomial curve. The probabilistic proximity can be used in any suitable manner. For example, the probabilistic proximity may be used to identify at least one action to be performed at step 616, and the at least one action can be performed at step 618. This may include, for example, the processor 102 identifying and initiating one or more actions in response to determining that the probabilistic proximity is below a threshold value or above a threshold value. Any suitable action(s) may be taken here, such as one or more adjustments to operations of a vehicle or robot.

Although FIG. 6 illustrates one example of a method 600 for proximity detection based on probabilistic computing, various changes may be made to FIG. 6. For example, as noted above, other approaches may be used to transform the covariance of a selected polynomial curve 304 into a corresponding covariance of a point 406, such as by using a linear combination of variances or computing the 2D covariance with a sampling technique. Also, while shown as a series of steps, various steps in FIG. 6 may overlap, occur in parallel, occur in a different order, or occur any number of times.

Note that while various examples and implementations of the proximity detection techniques are described above as involving the use of a 2D point and a 2D curve, the same techniques described above can be easily extended into higher dimensions. For example, the techniques described above can be easily extended for use with 3D points, 3D point clouds, and 3D curves.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying, using at least one processor, a first point associated with an uncertain location of an object in a space and a first uncertainty of the first point;
   identifying, using the at least one processor, a polynomial curve associated with an uncertain location of a feature in the space and a second uncertainty of the polynomial curve;
   determining, using the at least one processor, a probabilistic proximity of the object and the feature by:
   identifying a second point on the polynomial curve, including identifying a location on the polynomial curve where a line between the first point and the location on the polynomial curve is a normal vector of the polynomial curve;
   transforming the second uncertainty of the polynomial curve into a third uncertainty of the second point by transforming a covariance matrix of the polynomial curve into a covariance matrix of the second point using eigenvalues of the covariance matrix of the polynomial curve; and
   identifying the probabilistic proximity of the object and the feature using the first and second points, the first uncertainty associated with the first point, and the third uncertainty associated with the second point;
   identifying at least one action based on the probabilistic proximity; and
   performing the at least one action,
   wherein the at least one action is associated with a vehicle, and
   wherein the at least one action comprises at least one of:
   an adjustment to at least one of: a steering of the vehicle, a speed of the vehicle, an acceleration of the vehicle, and a braking of the vehicle; and
   an activation of an audible, visible, or haptic warning.

2. The method of claim 1, wherein the at least one action comprises an adjustment to a trajectory of a robotic arm.

3. The method of claim 1, wherein identifying the probabilistic proximity comprises:
   determining a statistical distance between the first and second points; and
   determining a probability that the first point is on the polynomial curve.

4. The method of claim 1, wherein:
   the first point is associated with an object around the vehicle, the object sensed using at least one sensor of the vehicle; and
   the polynomial curve is associated with an estimated path of the vehicle, an estimated center location of a lane, or an estimated location of a lane-marking line.

5. The method of claim 1, wherein:
   the first point is associated with an object around an autonomous robot, the object sensed using at least one sensor of the autonomous robot; and
   the polynomial curve is associated with an estimated trajectory of a robotic arm of the autonomous robot.

6. An apparatus comprising:
   at least one processor configured to:
   identify a first point associated with an uncertain location of an object in a space and a first uncertainty of the first point;
   identify a polynomial curve associated with an uncertain location of a feature in the space and a second uncertainty of the polynomial curve;
   determine a probabilistic proximity of the object and the feature;
   identify at least one action based on the probabilistic proximity; and
   initiate performance of the at least one action,
   wherein the at least one action is associated with a vehicle, and
   wherein the at least one action comprises at least one of:
   an adjustment to at least one of: a steering of the vehicle, a speed of the vehicle, an acceleration of the vehicle, and a braking of the vehicle; and
   an activation of an audible, visible, or haptic warning,
   wherein, to determine the probabilistic proximity, the at least one processor is configured to:
   identify a second point on the polynomial curve by an identification of a location on the polynomial curve where a line between the first point and the location on the polynomial curve is a normal vector of the polynomial curve;
   transform the second uncertainty of the polynomial curve into a third uncertainty of the second point by performance of a transform of a covariance matrix of the polynomial curve into a covariance matrix of the second point using eigenvalues of the covariance matrix of the polynomial curve; and
   identify the probabilistic proximity of the object and the feature using the first and second points, the first uncertainty associated with the first point, and the third uncertainty associated with the second point.

7. The apparatus of claim 6, wherein the at least one action comprises an adjustment to a trajectory of a robotic arm.

8. The apparatus of claim 6, wherein, to identify the probabilistic proximity, the at least one processor is configured to:
   determine a statistical distance between the first and second points; and
   determine a probability that the first point is on the polynomial curve.

9. The apparatus of claim 6, further comprising:
   one or more sensors configured to generate sensor measurements;

wherein the first point is associated with an object around the vehicle sensed using at least one of the one or more sensors; and wherein the at least one processor is further configured to generate the polynomial curve as an estimated path of the vehicle, an estimated center location of a lane, or an estimated location of a lane-marking line.

10. The apparatus of claim 6, further comprising:
one or more sensors configured to generate sensor measurements;
wherein the first point is associated with an object around an autonomous robot sensed using at least one of the one or more sensors; and
wherein the polynomial curve is associated with an estimated trajectory of a robotic arm of the autonomous robot.

11. A non-transitory machine-readable medium containing instructions that when executed cause at least one processor to:
identify a first point associated with an uncertain location of an object in a space and a first uncertainty of the first point;
identify a polynomial curve associated with an uncertain location of a feature in the space and a second uncertainty of the polynomial curve;
determine a probabilistic proximity of the object and the feature;
identify at least one action based on the probabilistic proximity; and
initiate performance of the at least one action,
wherein the at least one action is associated with a vehicle, and
wherein the at least one action comprises at least one of:
an adjustment to at least one of: a steering of the vehicle, a speed of the vehicle, an acceleration of the vehicle, and a braking of the vehicle; and
an activation of an audible, visible, or haptic warning,
wherein the instructions that when executed cause the at least one processor to determine the probabilistic proximity comprise instructions that when executed cause the at least one processor to:
identify a second point on the polynomial curve by an identification of a location on the polynomial curve where a line between the first point and the location on the polynomial curve is a normal vector of the polynomial curve;
transform the second uncertainty of the polynomial curve into a third uncertainty of the second point by performance of a transform of a covariance matrix of the polynomial curve into a covariance matrix of the second point using eigenvalues of the covariance matrix of the polynomial curve; and
identify the probabilistic proximity of the object and the feature using the first and second points, the first uncertainty associated with the first point, and the third uncertainty associated with the second point.

12. The non-transitory machine-readable medium of claim 11, wherein the at least one action comprises an adjustment to a trajectory of a robotic arm.

13. The non-transitory machine-readable medium of claim 11, wherein the instructions that when executed cause the at least one processor to identify the probabilistic proximity comprise instructions that when executed cause the at least one processor to:
determine a statistical distance between the first and second points; and
determine a probability that the first point is on the polynomial curve.

14. The non-transitory machine-readable medium of claim 11, wherein:
the first point is associated with an object around the vehicle that is sensed using at least one sensor of the vehicle; and
the instructions when executed further cause the at least one processor to generate the polynomial curve as an estimated path of the vehicle, an estimated center location of a lane, or an estimated location of a lane-marking line.

15. The non-transitory machine-readable medium of claim 11, wherein:
the first point is associated with an object around an autonomous robot that is sensed using at least one sensor of the autonomous robot; and
the instructions when executed further cause the at least one processor to generate the polynomial curve as an estimated trajectory of a robotic arm of the autonomous robot.

* * * * *